United States Patent [19]
Takasaki et al.

[11] Patent Number: 6,119,577
[45] Date of Patent: Sep. 19, 2000

[54] BRAKE BOOSTER

[75] Inventors: Yoshiyasu Takasaki, Saitama-ken; Mamoru Sawada; Yuzo Imoto, both of Aichi-Pref, all of Japan

[73] Assignees: Jidosha Kiki Co., Ltd., Tokyo; Denso Corporation, Kariya, both of Japan

[21] Appl. No.: 09/187,968

[22] Filed: Nov. 6, 1998

[30] Foreign Application Priority Data

Nov. 28, 1997 [JP] Japan ..................................... 9-343745
Oct. 13, 1998 [JP] Japan ................................... 10-290268

[51] Int. Cl.[7] ..................................................... F15B 13/16
[52] U.S. Cl. ...................... 91/367; 91/376 R; 303/113.3; 303/114.3
[58] Field of Search .................................. 91/367, 376 R; 303/114.3, 113.3

[56] References Cited

U.S. PATENT DOCUMENTS 5,845,556  12/1998  Tsubouchi et al. ........................ 91/367

FOREIGN PATENT DOCUMENTS 92-243  1/1997  Japan .

Primary Examiner—Edward K. Look
Assistant Examiner—Thomas E. Lazo
Attorney, Agent, or Firm—Flynn, Thiel, Boutell & Tanis, P.C.

[57] ABSTRACT

A tandem brake booster includes a solenoid within a valve body, and the solenoid may be energized to move a first tubular member disposed on the valve body rearward. When an input shaft is driven forward in the inoperative condition of the brake booster, a vacuum valve is closed while an atmosphere valve is opened in the similar manner as occurs in the prior art, thus actuating the tandem brake booster 1. When an input or the force of depression applied to a brake pedal rises to a given value X during the operative condition of the brake booster, the solenoid is energized, whereupon the first tubular member is moved rearward relative to the valve body, and the valve element is also moved rearward. This opens the atmosphere valve which has been closed during the servo balance condition, allowing a further introduction of the atmosphere into variable pressure chambers B, D, enabling a rise in the output even though the input remains unchanged. In this manner, the invention provides a functioning which is equivalent to a brake booster which is arranged to provide a variable servo ratio.

4 Claims, 5 Drawing Sheets

BRAKE BOOSTER

FIELD OF THE INVENTION

The invention relates to a brake booster, and more particularly, to a brake booster which is capable of increasing an output therefrom without changing the force of depression of a brake pedal after the commencement of operation.

DESCRIPTION OF THE PRIOR ART

A brake booster is known in the art which is arranged to permit a servo ratio to be changed after the commencement of operation. In a conventional brake booster of the kind described, the servo ratio is maintained low under the condition that the input or the force of depressing a brake pedal is low as upon commencement of operation, while the servo ratio is increased under the condition that an increased force of depression prevails after the commencement of operation. In this manner, a brake feeling which is favorable to a driver is achieved by changing the servo ratio after the commencement of operation.

A brake booster is also known in the art (see, for example, Japanese Laid-Open Patent Application No. 2,243/1997) which is operable as an automatic brake without depressing the brake pedal. A brake booster which functions as an automatic brake can be actuated without the depression of a brake pedal, by actuating a drive mechanism within the brake booster to operate a valve mechanism therein when required.

SUMMARY OF THE INVENTION

It is an object of an invention to provide a brake booster which utilizes the arrangement of a brake booster functioning as a known automatic brake as mentioned above to provide a brake booster having the capability of providing a variable servo ratio.

Thus, the invention relates to a brake booster including a substantially tubular valve body sidably disposed within a shell, a power piston mounted on the valve body, a constant and a variable pressure chamber defined across the power piston, a tubular member slidably mounted on the valve body, an annular vacuum valve seat formed at the rear end of the tubular member, a valve plunger disposed within the valve body in a movable manner and coupled to an input shaft for movement therewith, an annular atmosphere valve seat formed on the valve plunger, a valve element urged forwardly by a spring for movement into engagement with or disengagement from the vacuum valve seat and the atmosphere valve seat, a vacuum valve formed by a combination of the vacuum valve seat and a first seat area on the valve element which moves into engagement with or disengagement from the vacuum valve seat, an atmosphere valve formed by a combination of the atmosphere valve seat and a second seat area on the valve element which moves into engagement with or disengagement from the atmosphere valve seat, a constant pressure passage which provides a communication between a space located radially outward of the vacuum valve and the constant pressure chamber, a variable pressure passage which provides a communication between a space located between the vacuum and the atmosphere valve and the variable pressure chamber, an atmosphere passage which provides a communication between a space located radially inward of the atmosphere valve and the atmosphere, a drive mechanism for moving the tubular member to its inoperative and its operative position which are disposed forwardly and rearwardly relative to the valve body, and a reaction disc which transmits a reaction from the output as the valve body is driven forward to the valve plunger, the arrangement being such that when the drive mechanism moves the tubular member rearward, the first seat area is seated upon the vacuum valve seat to close the vacuum valve while the second seat area is moved away from the atmosphere valve seat to open the atmosphere valve. In accordance with the invention, the operative and the inoperative position of the tubular member are chosen to permit an opening/closing of the vacuum valve and the atmosphere valve as the valve plunger is driven back and forth in response to the movement of the input shaft.

With the described arrangement, when the tubular member assumes its inoperative position, as the input shaft and the valve plunger are driven forward to close the vacuum valve and to open the atmosphere valve, the atmosphere is introduced into the variable pressure chamber to allow the valve body to be driven forward by the pressure differential between the negative pressure within the constant pressure chamber and the atmospheric pressure within the variable pressure chamber, or the brake booster is actuated. If the force with which a brake pedal is depressed remains constant, the atmosphere valve as well as the vacuum valve are closed to maintain a servo balance condition.

Subsequently, when the drive mechanism moves the tubular member from its inoperative to its operative position while the brake booster is actuated, the valve plunger is maintained in its current position while the tubular member (or vacuum valve seat) and the valve element move rearwardly. This causes the second seat area on the valve element to be moved away from the atmosphere valve seat formed on the valve plunger, thus opening the atmosphere valve. This allows a further introduction of the atmosphere into the variable pressure chamber to increase the pressure differential between the negative pressure within the constant pressure chamber and the atmospheric pressure within the variable pressure chamber, driving the valve body further forward. As a consequence, an output from the brake booster rises even though the force with which a brake pedal is depressed remains unchanged. In this manner, the output can be increased without changing the force of depressing a brake pedal during the operative condition.

Since the output increases and the valve body is driven forward, the valve body is also moved forward therewith, and the second seat area on the valve body becomes seated on the atmosphere valve seat formed on the valve plunger which remains stationary to close the atmosphere valve. Thus the vacuum valve and the atmosphere valve are both closed to achieve the servo balance condition. As the force to depress a brake pedal is further increased, the atmosphere valve is opened to increase the output. In this manner, an increased output can be obtained with a reduced input or force of depression as compared with a situation that the tubular member remains at its inoperative position, by causing the tubular member to be moved to its operative position during the operative condition of the brake booster even though the servo ratio itself remains constant.

It is to be noted that if the force of depression is reduced from the value which achieved the servo balance condition while the tubular member remains at its operative position, the valve plunger, the atmosphere valve seat formed thereon and the second seat area on the valve element which engages the atmosphere valve seat will retract relative to the tubular member and the valve body, whereby the first seat area on the valve element moves away from the vacuum valve seat formed on the tubular member to open the vacuum valve. This allows a communication between the constant and the variable pressure chamber to reduce the pressure differential therebetween, thus reducing the output from the brake booster. In this manner, there is obtained a functioning which is equivalent to a brake booster capable of changing a servo ratio.

Above and other objects and advantages of the invention will become apparent from the following description of an embodiment thereof with reference to the attached drawings.

DETAILED DESCRIPTION OF THE EMBODIMENT

Figure 1:
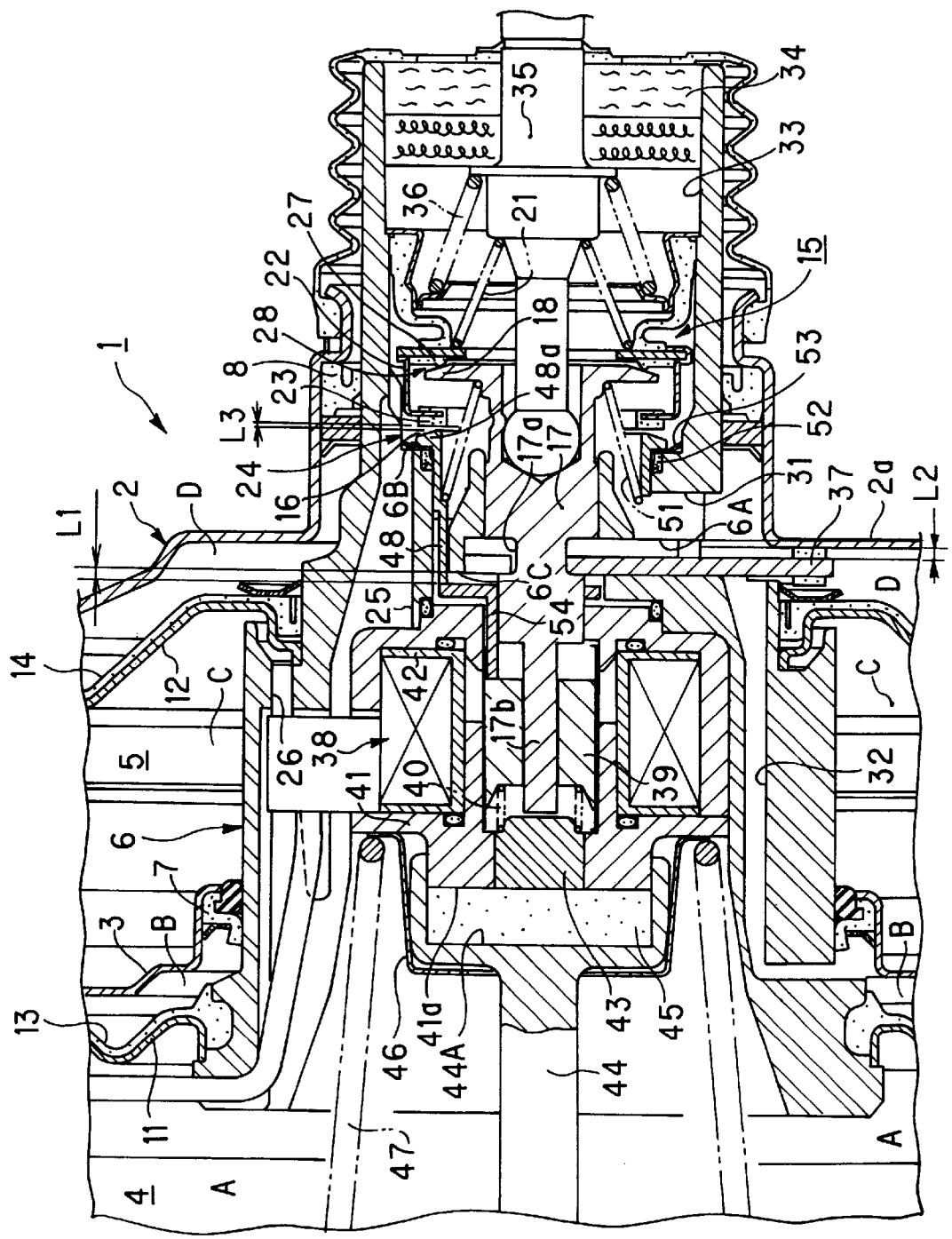
FIG. 1 is a cross section of an embodiment of the invention.

Referring to the drawings, an embodiment of the invention will now be described.

Figure 2:
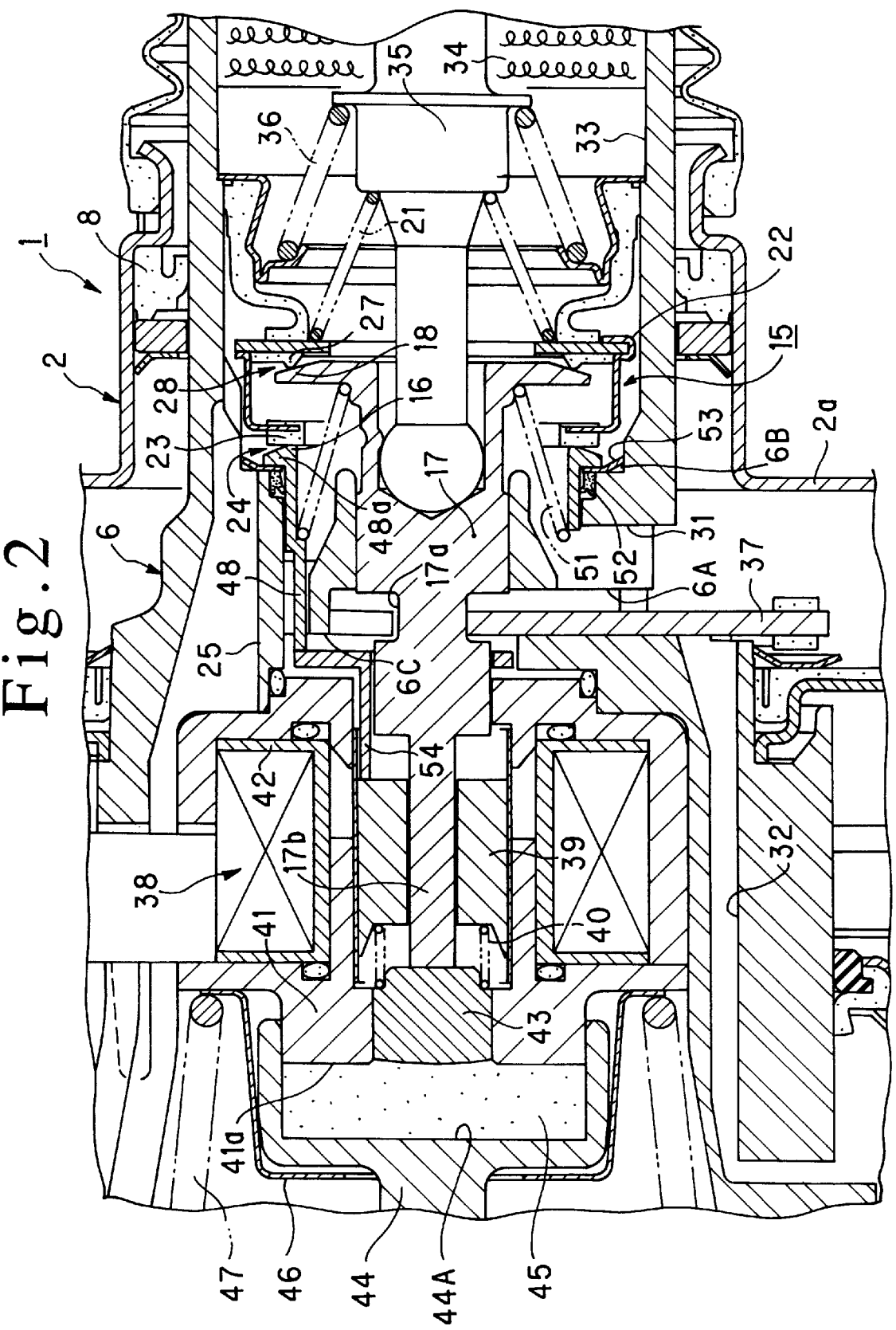
FIG. 2 is a cross section of the embodiment shown in FIG. 1 when it is actuated.

Referring to FIGS. 1 and 2, a brake booster 1 of tandem type includes a shell 2, in which a centerplate 3 is centrally provided to divide the interior of the shell into a forwardly located, front chamber 4 and a rearwardly located rear chamber 5. A tubular valve body 6 slidably extends through the shell 2 with seal means 7, 8 disposed around the inner periphery of the shell 2 at its rear end, which is at its right-hand end as viewed in these Figures, and around the inner periphery of the centerplate 3, thus maintaining a hermetic seal thereat.

A front power piston 11 and a rear power piston 12 are connected to the outer periphery of the valve body 6 at locations which are disposed within the front chamber 4 and the rear chamber 5, respectively. A front diaphragm 13 and a rear diaphragm 14 are applied to the back surfaces of the respective power pistons 11 and 12. The front diaphragm 13 partitions the interior of the front chamber into a constant pressure chamber A and a variable pressure chamber B, and the rear diaphragm 14 partitions the interior of the rear chamber 5 into a constant pressure chamber C and a variable pressure chamber D.

A valve mechanism 15 which switches a communication between the constant pressure chambers A, C and the variable pressure chambers B, D is disposed within the valve body 6. The valve mechanism 15 comprises an annular vacuum valve seat 16 formed on the valve body 6 in a movable manner, a valve plunger 17 slidably fitted into the valve body 6 and extending through the vacuum valve seat 16, an atmosphere valve seat 18 formed on the right end thereof, and a valve element 22 urged by a spring 21 from the rear side to be seated on either valve seat 16, 18.

A combination of the vacuum valve seat 16 and a first seat area 23 on the valve element 22 which moves into engagement with or disengagement from the valve seat 16 defines a vacuum valve 24. A space located radially outward of the vacuum valve 24 communicates with the constant pressure chamber A through a first constant pressure passage 25 formed in the valve body 6, and the constant pressure chamber A communicates with the constant pressure chamber C through a second constant pressure passage 26. It is to be understood that the constant pressure chamber A is maintained in communication with a source of negative pressure through a tubing (not shown) which introduces a negative pressure, whereby the negative pressure is normally introduced into the constant pressure chambers A and C.

A combination of the atmosphere valve seat 18 and a second seat area 27 on the valve element 22 which moves into engagement with or disengagement from the valve seat 18 defines an atmosphere valve 28. A space located between the second seat area 27 and the first seat area 23 communicates with the variable pressure chamber D through a radially extending, first variable pressure passage 31 formed in the valve body 6, and the variable pressure chamber D in turn communicates with the variable pressure chamber B through a second variable pressure passage 32 formed in the valve body 6.

Finally, a space located radially inward of the second seat area 27 on the valve element 22 which moves into engagement with or disengagement from the atmosphere valve seat 18 communicates with the atmosphere through an atmosphere passage 33 formed in the valve body 6 and through a filter 34 disposed therein.

The rear end of the valve plunger 17 is pivotally connected with a distal end of an input shaft 35, and a spring 36 having a greater resilience than the spring 21 is disposed between the input shaft 35 and the valve body 6, thus causing the second seat area 27 on the valve element 22 to be seated on the atmosphere valve seat 18 to close the atmosphere valve 28 in the inoperative condition of the tandem brake booster 1 shown in FIG. 1 while causing the first seat area 23 on the valve element 22 to move away from the vacuum valve seat 16 to open the vacuum valve 24. The other end of the input shaft 35 is coupled to a brake pedal, not shown. In the inoperative condition mentioned, all of the chambers A, B, C and D communicate with each other, and the negative pressure is introduced in the respective chambers A, B, C and D.

A radial opening 6A is formed in the valve body 6 at a location slightly forwardly of the first variable pressure passage 31, and a key member 37, which is known in itself, passes through the radial opening 6A to be engaged with an engaging portion 17a of a reduced diameter on the valve plunger 17, thus preventing the valve plunger 17 from being withdrawn rearwardly from the valve body 6.

The key member 37 is displaceable axially of the valve body 6 within the radial bore 6A, and the key member 37 and the valve plunger 17 are displaceable axially of the valve body 6 within the extent of the axial length of the engaging portion 17a.

When the tandem brake booster 1 shown in FIG. 1 is inoperative, the key member 37 abuts against a rear wall surface 2a of the shell 2 to maintain the key member 37 and the valve plunger 17 at advanced positions relative to the valve body 6, thus reducing a lost motion of the input shaft 35 at the commencement of operation of the tandem brake booster 1.

At a location forwardly of the radial bore 6A, a housing 41 for a solenoid 38 is hermetically fitted around the inner periphery of the valve body 6. The housing 41 is generally cylindrical and contains around its outer periphery a spool 42 carrying a coil winding.

A cylindrical piston 39 is slidably fitted into the inner periphery of the housing 41, and a front portion 17b of the plunger 17 which has a reduced diameter extends through the piston 39. A plunger plate 43 is slidably fitted into the inner periphery of the housing 41 at a location forwardly of the piston 39, thus maintaining the rear end face of the plunger plate 43 in closely spaced and opposing relationship with the front end face of the portion 17b of a reduced diameter. A spring 40 is disposed between the plunger plate 43 and the opposing end face of the piston 39, whereby the plunger plate 43 and the piston 39 are urged to move away from each other.

An output shaft 44 is disposed forwardly of the housing 41 for the solenoid 38, and is formed at its one end with a recess 44A in which a reaction disc 45 is received. Under this condition, the recess 44A of the output shaft 44 is slidably fitted around the outer periphery of the housing 41 at its front end, thus causing the reaction disc 45 to abut against a front end face 41a of the housing 41. Accordingly, the reaction disc 45 opposes the front end face of the plunger plate 43 which is disposed adjacent to and rearward of the reaction disc 45. Said one end of the output shaft 44 is covered by a cup-shaped retainer 46 which is fitted from the front side, and a flange-like outer periphery of the retainer 46 abuts against a stepped end face of the housing 41. A return spring 47 is disposed between this outer periphery of the retainer 46 and the front wall surface of the shell 2, thereby maintaining the valve body 6 and other members in their inoperative positions shown in FIG. 1.

The other end or the front end of the output shaft 44 projects externally through the front wall surface of the shell 2 for connection with a piston of a master cylinder, not shown.

In the present embodiment, an arrangement is made so that the vacuum valve seat 16 is axially movable relative to the valve body 6, and the vacuum valve seat 16 can be displaced rearwardly through a given stroke relative to the valve body 6 by energizing the solenoid 38 which operates as a drive mechanism.

Specifically, the inner periphery of the valve body 6 is provided with a stepped end face 6B which faces rearward at a location forwardly of the valve element 22, defining a substantially annular space inward of the stepped end face 6B which extends axially forward. A first tubular member 48 is slidably fitted into this space from the rear side, and the rear end of the first tubular member 48 is formed with a flange 48a which extends radially outward with an increased diameter. The inner peripheral edge of the flange 48a defines the vacuum valve seat 16.

The first tubular member 48 also includes a front portion which has a reduced diameter as compared with its rear portion, thereby defining a step in the inner periphery of the first tubular member 48, and a spring 51 is disposed between this step and the outer periphery of the valve plunger 17 which is located axially rearward, thus normally urging the first tubular member 48 in the forward direction. It is to be noted that the first tubular member 48 is formed of a non-magnetic material.

An annular recess is formed in the inner peripheral edge of the stepped end face 6B, and is fitted with an annular seal member 52, and an annular retainer 53 is then disposed as a press fit into the inner periphery of the valve body 6 for abutment against the stepped end face 6B, thereby preventing the annular seal member 52 from being withdrawn rearwardly from an annular recess 6C.

Because the inner periphery of the annular seal member 52 is tightly in contact with the outer periphery of the first tubular member 48, the annular seal member 52 is effective to maintain a hermetic seal between the outer periphery of the first tubular member 48 and the inner periphery of the valve body 6.

In the present embodiment, the solenoid 38 is of a type which is on-and off-controlled by a controller, not shown. When the solenoid 38 is energized by the controller, the piston 39 is urged rearward with respect to the housing 41 and the valve body 6.

A second tubular member 54 is disposed between the piston 39 associated with the solenoid 38 and the first tubular member 48, and at its front end, the outer periphery of the second tubular member 54 is slidably fitted into the inner periphery of the housing 41. On the other hand, the rear end of the second tubular member 54 is formed with a flange, which is slidably fitted into the inner periphery of the valve body 6 while opposing the front end of the first tubular member 48. It will be noted that the second tubular member 54 is slidably fitted around the outer periphery of the valve plunger 17 which is disposed forwardly of the key member 37.

As mentioned previously, the first tubular member 48 is urged in the forward direction by the spring 51 while the piston 39 is urged in the rearward direction by the spring 40 which is disposed between the piston and the plunger plate 43. Accordingly, the axial ends of the second tubular member 54 are held sandwiched between the piston 39 and the first tubular member 48, and hence, as the piston 39 is axially driven, the second tubular member 54 and the first tubular member 48 are also axially driven in response thereto.

The resilience of the spring 40 is chosen to be less than the resilience of the spring 51, and accordingly, in the inoperative condition as shown in FIG. 1 when the solenoid 38 is not energized and a brake pedal, not shown, is not depressed, the resilience of the spring 51 is effective to maintain the flange 48a of the first tubular member 48 at its advanced end position (inoperative position) where it abuts against the retainer 53. Hence, as mentioned previously, the vacuum valve seat 16 provided on the first tubular member 48 is spaced from the first seat area 43 on the valve element to open the vacuum valve 24. The resilience of the spring 40 is effective to maintain the plunger plate 43 in light abutment against the reaction disc 45. At this time, a very small clearance is maintained between the front end face of the valve plunger 17 and the plunger plate 43.

In the present embodiment, the arrangement is such that after the tandem brake booster 1 is actuated by the depression of a brake pedal, not shown, under the inoperative condition shown in FIG. 1, the solenoid 38 is energized by the controller when a sensor, not shown, detects that the input or the force with which the brake pedal is depressed, has risen to a given value X. Thereupon, the first tubular member 48 is driven rearwardly relative to the valve body 6 to its operative position shown in FIG. 3 in response to the movement of the piston 39 which is driven rearward against the resilience of the spring 51. The stroke L1 through which the first tubular member 48 is driven rearwardly from the inoperative position shown in FIG. 1 to the operative position shown in FIG. 3 relative to the valve body 6 as the solenoid 38 is energized is determined by the location where the rear end of the second tubular member 54 abuts against the stepped end face 6C of the opposing valve body 6.

The stroke L2 over which the valve plunger 17 can be moved rearwardly relative to the valve body 6 is determined by the spacing between the rear end face of the key member 37 and the opposing rear end face of the radial opening 6A shown in FIG. 1. Denoting a distance by which the vacuum valve seat 16 on the first tubular member 48 which assumes its inoperative position is spaced from the first seat area 23 on the valve element 22 in the inoperative condition of the tandem brake booster 1 in which the solenoid 38 is not energized by L3, the dimensions of various parts are adjusted so that the values L1, L2 and L3 satisfy the following relationship:

L1<L2+L3

In other words, in the present embodiment, the operative and the inoperative position of the first tubular member 48 are chosen to permit an opening/closing of the vacuum valve 24 and the atmosphere valve 28 as the valve plunger 17 is driven back and forth in response to the movement of the input shaft 35.

Operation

With the described arrangement, in the inoperative condition shown in FIG. 1 in which the solenoid 38 is not energized and a brake pedal, not shown, is not depressed, the flange 48a of the first tubular member 48 is maintained in its inoperative position where it abuts against the retainer 43. Accordingly, the vacuum valve seat 16 is spaced from the first seat area 23 on the valve element 22 to open the vacuum valve 24 while the second seat area 28 on the valve element 22 is seated upon the atmosphere valve seat 18 to close the atmosphere valve 28. Under this inoperative condition, the resilience of the spring 51 is effective to maintain the front end of the valve plunger 17 to be slightly spaced from the rear end face of the plate plunger 43. The front end face of the plunger plate 43 lightly abuts against the reaction disc 45. The chambers A, B, C and D communicate with each other, and the negative pressure is introduced into these chambers.

When a brake pedal, not shown, is depressed under the inoperative condition shown in FIG. 1, the input shaft 35 and the valve plunger 17 are driven in the forward direction, whereby the first seat area 23 on the valve element 22 is initially seated upon the vacuum valve seat 16 to close the vacuum valve 24, followed by a movement of the atmosphere valve seat 18 away from the second seat area 27 on the valve element to open the atmosphere valve 28. This blocks a communication between the both constant pressure chambers A, C and the both variable pressure chambers B, D, and the atmosphere is introduced into the both variable pressure chambers B, D. The pressure differential between the negative pressure within the both constant pressure chambers A, C and the atmospheric pressure within the both variable pressure chambers B, D is effective to drive the both power pistons 11, 12 and the valve body 6 or the like in the forward direction (FIG. 2).

The tandem brake booster 1 is actuated in this manner, and a reaction from the output which acts on the output shaft 44 causes the reaction disc 45 to be compressed, whereby its axial portion bulges rearwardly. Accordingly, the spring 40 is compressed to cause the plunger plate 43 to move rearwardly toward the valve plunger 17, thus providing an abutment between the ends of the plunger plate 43 and the valve plunger 17 (FIG. 2). As shown at P in FIG. 5, the output sharply rises at this point, which is commonly referred to as a jumping. From the jumping point P on, a reaction from the output acting on the output shaft 44 is transmitted to a driver through the valve plunger 17, the input shaft 35 and the brake pedal, not shown.

Subsequently, as the input increases, the output rises in accordance with a given servo ratio (solid line Q shown in FIG. 5) which is determined by the area of the end face 41a of the housing 41 and the area of the front end face of the plunger plate 43. When the atmosphere valve 28 as well as the vacuum valve 24 are closed as the valve body 6 advances, as shown in FIG. 2, a servo balance condition is reached.

As mentioned previously, when the input rises to a given value X after the tandem brake booster 1 has been actuated, this is detected by a sensor, not shown, and a sensed output is fed to a controller, not shown. Thereupon the controller energizes the solenoid 38, whereby the first tubular member 48 is moved to its operative position shown in FIG. 3. This causes the vacuum valve seat 16 formed on the first tubular member 48 and the valve element 22 which is seated thereon to be moved rearwardly relative to the valve body 6 and the valve plunger 17 through the stroke L1 from the servo balance condition in which the vacuum valve 24 and the atmosphere valve 28 are both closed. Accordingly, the second seat area 27 on the valve element 22 moves away from the atmosphere valve seat 18 formed on the valve plunger 17, thus opening the atmosphere valve 28. This causes a further introduction of the atmosphere into the variable pressure chambers B, D, whereby the output further rises without any change in the input (point R shown in FIG. 5). An increment Y in the output which occurs when the first tubular member 48 is moved to its operative position remains the same for any input, provided the input is equal to or greater than X.

When the first tubular member 48 is positioned at its operative position and the output rises, the valve body 6 is further advanced, whereby the second seat area 27 on the valve element 22 which has been removed becomes seated upon the atmosphere valve seat 18 on the valve plunger 17, thus closing the atmosphere valve 28. In other words, both the vacuum valve 22 and the atmosphere valve 28 are closed to establish the servo balance condition (FIG. 3).

When the input or the force of depression increases under this servo balance condition, the valve plunger 17 is driven forward to open the atmosphere valve 28, whereby the output rises by an amount corresponding to the input or the force of depression. A line Z shown in FIG. 5 indicates a change in the output which occurs when the first tubular member 48 is at its operative position and the input or the force of depression lies in a region equal to or greater than X.

Figure 3:
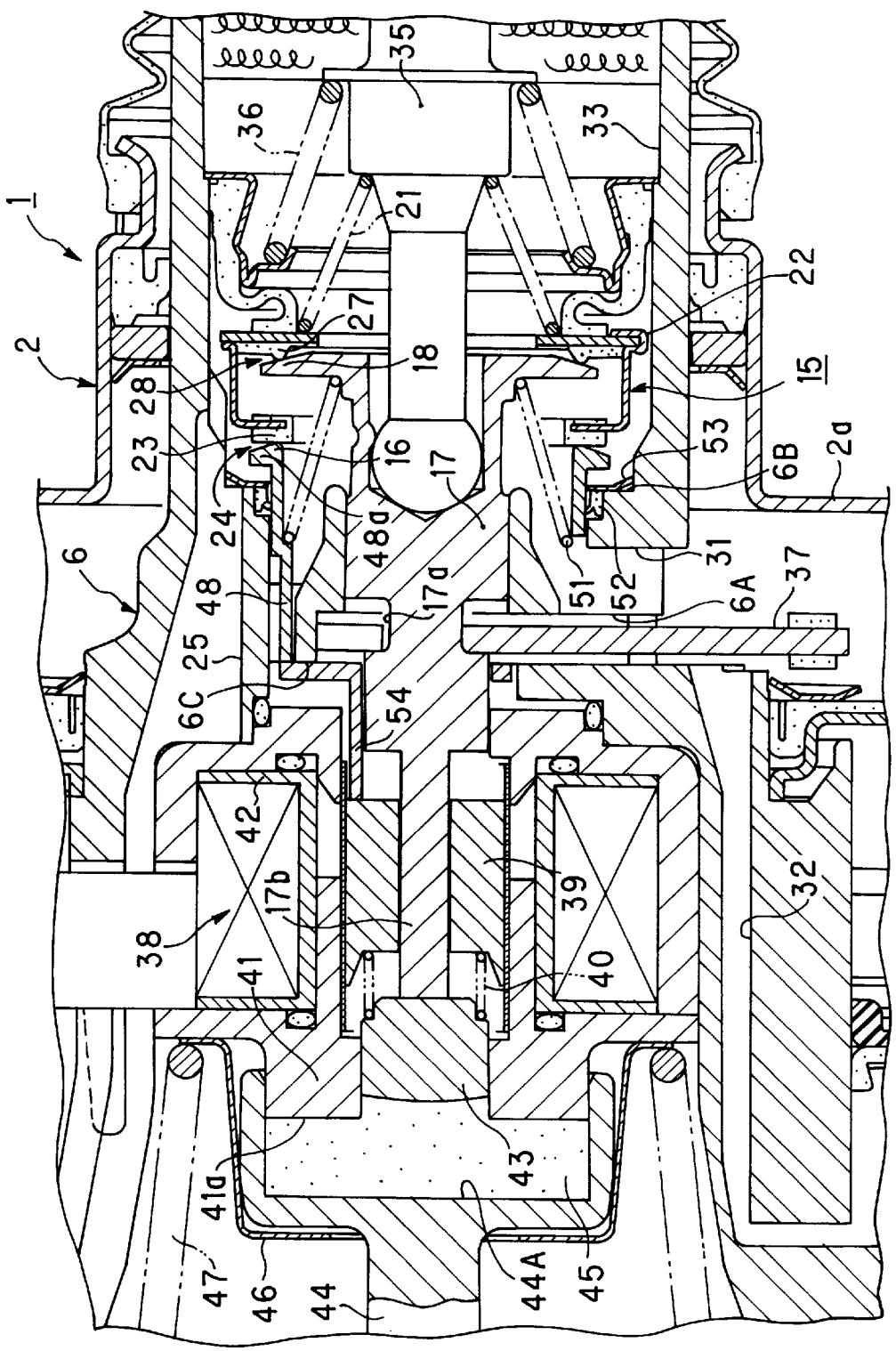
FIG. 3 is a similar cross section to FIG. 1 illustrating another phase of operation.

When the first tubular member 48 assumes its operative position and the valve body 6 is driven forward, a reaction from the output also increases, and accordingly, the amount by which the axial portion of the reaction disc 45 bulges rearwardly increases, as shown in FIG. 3. Concomitantly, the valve plunger 17 and the valve element 22 which is seated upon the atmosphere valve seat 18 formed thereon are pushed back rearward relative to the valve body 6 and the first tubular member 48 which assumes its operative position from the servo balance condition in which both the vacuum valve 24 and the atmosphere valve 28 are closed.

Figure 5:
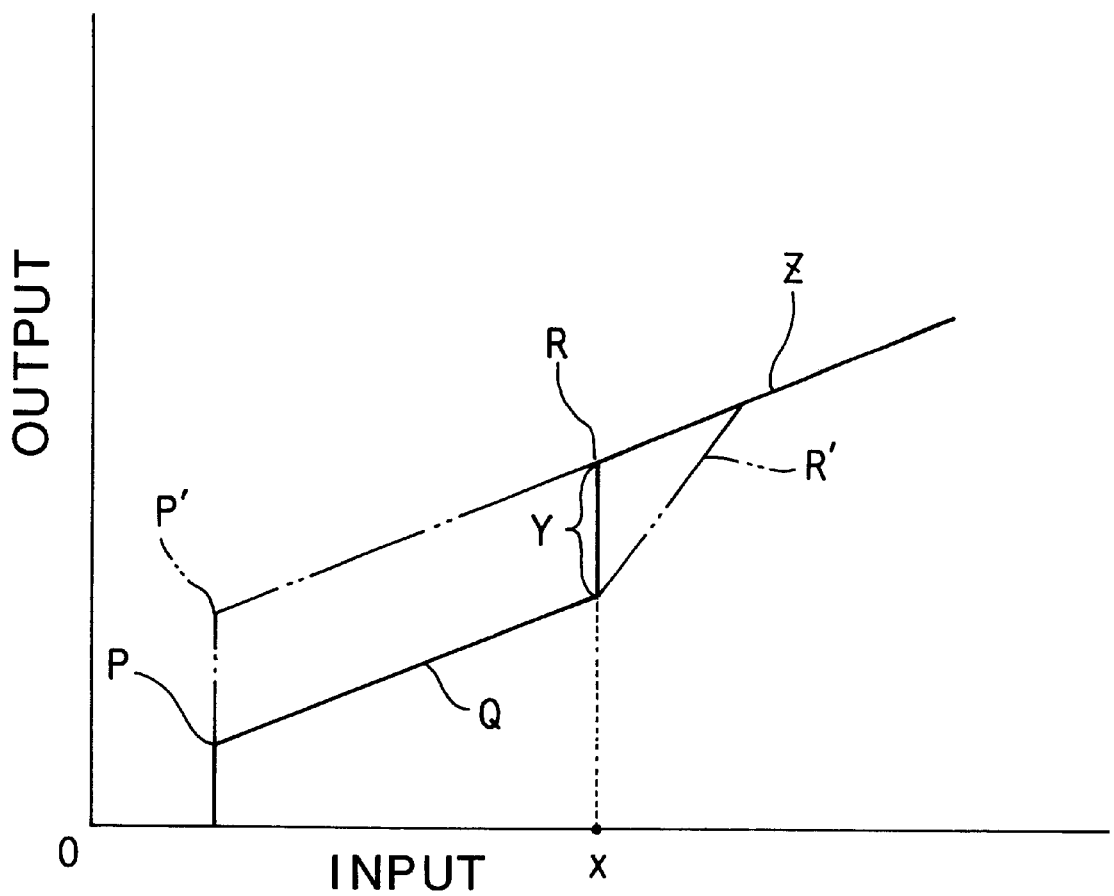
FIG. 5 graphically shows a characteristic response representing a relationship between an input and an output when the embodiment shown in FIG. 1 is actuated.

An increase in the amount by which the axial portion of the reaction disc 45 bulges rearward indicates that the magnitude of the output at the jumping (P') which occurs as the brake pedal is depressed to actuate the tandem brake booster 1 under the inoperative condition of the tandem brake booster 1 and when the first tubular member 48 is positioned at its operative position will be by an amount indicated by Y greater, as shown by phantom lines in FIG. 5. In this manner, an output response (as indicated by line Z) is obtained which prevails when the tandem brake booster 1 is actuated, the solenoid 38 is energized for an input equal to X and the first tubular member 48 is positioned at its operative position.

In the present embodiment, there can be obtained an output response which corresponds to a substantially increased servo ratio for the region of the input after the commencement of operation which is equal to or greater than X as compared for an input after the commencement of operation which lies in a region less than X, even though the servo ratio itself remains unchanged.

Accordingly, a brake feeling which is imparted to a driver through the brake pedal can be improved in a similar manner as achieved by using a conventional brake booster which is arranged to provide a variable servo ratio.

Figure 4:
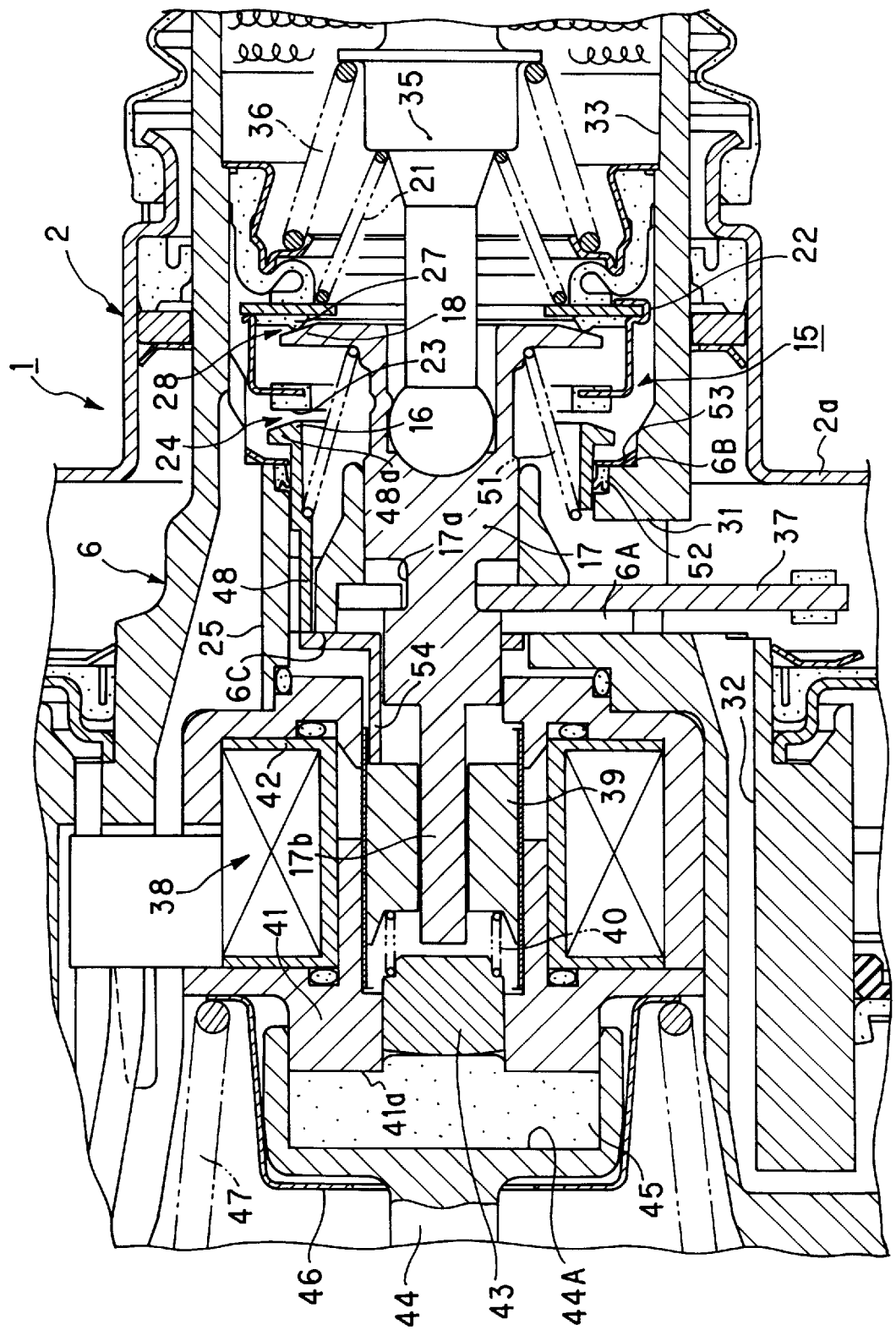
FIG. 4 is a cross section similar to FIG. 2, illustrating a further phase of operation.

When the input or the force of depression is reduced under the servo balance condition shown in FIG. 3 in which the first tubular member 48 is at its operative position and both the vacuum valve 24 and the atmosphere valve 28 are closed, the valve plunger 17 and the valve element 22 retract rearwardly relative to the valve body 6 and the first tubular member 48. In the present embodiment, the stroke or distances L1, L2 and L3 are chosen in a manner mentioned previously, and hence, the first tubular member 48 cannot be moved rearward relative to the valve body 6. Accordingly, the first seat area 23 on the valve element 22 moves away from the vacuum valve seat 16 to open the vacuum valve 24 (FIG. 4). This allows the atmosphere in the variable pressure chambers B, D to flow into the constant pressure chambers A, C to reduce the pressure differential between the constant pressure chambers A, C and the variable pressure chambers B, D, whereby the output is reduced.

In this manner, in the present embodiment, when the solenoid 38 is energized to position the first tubular member 48 at its operative position, the output from the brake booster can be regulated if the driver operates the brake pedal to drive the input shaft back and forth.

In addition, the present embodiment dispenses with the need to provide means which detects that the brake pedal is operated by a driver, and accordingly, the internal arrangement of the valve body 6 can be simplified as compared with a conventional arrangement (as disclosed in Japanese Laid-Open Patent Application No. 2,243/1997) in which such detecting means is disposed within the valve body.

Instead of the disclosed solenoid 38 of the on/off type which serves as the drive mechanism, a drive mechanism may be employed which changes the force with which the piston 39 is urged in accordance with the magnitude of a voltage applied to provide a rate of rise in the output, as indicated by phantom lines R' in FIG. 5, which is more gentle as compared with the described embodiment.

While the above embodiment has been described as an application of the present invention to a tandem brake booster, it should be understood that the invention is equally applicable to a brake booster of a singly type, namely, having a single pair of constant and variable pressure chambers or a brake booster of triple type, namely, having three pairs of constant and variable pressure chambers.

Finally, while the solenoid 38 is energized by the controller for an input which is equal to a given value X in the above embodiment, the solenoid 38 may also be energized by the controller in an alternative manner, such as when an "panic brake" in which a rate of advance of the input shaft exceeds a given value is detected by a sensor or when the need for a quick braking is detected by an obstacle sensor.

While the invention has been disclosed above in connection with an embodiment thereof, it should be understood that a number of changes, modifications and substitutions therein are possible from the above disclosure without departing from the scope and spirit of invention defined by the appended claims.

What is claimed is:

1. A brake booster including a substantially tubular valve body slidably disposed within a shell, a power piston mounted on the valve body, a constant and a variable pressure chamber defined across the power piston, a tubular member slidably mounted on the valve body, an annular vacuum valve seat formed on a rear end of the tubular member, a valve plunger disposed within the valve body in a movable manner and coupled to an input shaft for movement therewith, an annular atmosphere valve seat formed on the valve plunger, a valve element urged in the forward direction by a spring for movement into engagement with or disengagement from the vacuum valve seat and the atmosphere valve seat, a vacuum valve defined by a combination of the vacuum valve seat and a first seat area on the valve element which moves into engagement with or disengagement from the vacuum valve seat, an atmosphere valve defined by a combination of the atmosphere valve seat and a second seat area on the valve element which moves into engagement with or disengagement from the atmosphere valve seat, a constant pressure passage which provides a communication between a space located radially outward of the vacuum valve and the constant pressure chamber, a variable pressure passage which provides a communication between a space located between the vacuum valve and the atmosphere valve and the variable pressure chamber, an atmosphere passage which provides a communication between a space located radially inward of the atmosphere valve with an atmosphere, a drive mechanism for moving the tubular member between an inoperative position and an operative position which are located forwardly and rearwardly of the valve body, and a reaction disc for transmitting a reaction from an output which is produced as the valve body is driven forward to the valve plunger, the arrangement being such that the drive mechanism may move the tubular member in the rearward direction to cause the first seat area to be seated on the vacuum valve seat to close it while causing the second seat area to be removed from the atmosphere valve seat to open the atmosphere valve;

characterized in that the operative and the inoperative position of the tubular member are chosen to permit an opening and a closing of the vacuum valve and the atmosphere valve as the valve plunger is driven back and forth in response to a movement of the input shaft.

2. A brake booster according to claim 1 in which denoting a stroke through which the tubular member is moved rearward relative to the valve body as the drive mechanism is operated by L1, a second stroke through which the valve plunger is movable can be moved rearward relative to the valve body by L2, and a spacing between the vacuum valve seat on the tubular member which assumes the inoperative position and the first seat area on the valve element by L3, the dimensions of the strokes and spacing are chosen such that $$L1 < L2 + L3.$$

3. A brake booster according to claim 1 in which the drive mechanism comprises a solenoid which may be energized to cause a displacement of an associated piston and the tubular member is moved rearward relative to the valve body from the inoperative positoin to be operative position in response thereto.

4. A brake booster according to claim 1 in which the tubular member is formed of a non-magnetic material.

* * * * *

UNITED STATES PATENT AND TRADEMARK OFFICE
CERTIFICATE OF CORRECTION

PATENT NO : 6 119 577
DATED : September 19, 2000
INVENTOR(S) : Yoshiyasu TAKASAKI, et al.

It is certified that error appears in the above-identified patent and that said Letters Patent are hereby corrected as shown below:

Claim 2, line 49; delete "can be moved".

Claim 3, line 62; replace "positoin to be" to ---position to the---.

Signed and Sealed this

Twenty-ninth Day of May, 2001

*Attest:*

NICHOLAS P. GODICI

*Attesting Officer*     Acting Director of the United States Patent and Trademark Office